United States Patent

[11] 3,600,608

[72] Inventor Edward O. Gilbert
Ann Arbor, Mich.
[21] Appl. No. 822,913
[22] Filed May 8, 1969
[45] Patented Aug. 17, 1971
[73] Assignee Reliance Electric Company

[54] HIGH SPEED LOW-OFFSET ELECTRONIC SWITCH FOR ANALOG SIGNALS

15 Claims, 2 Drawing Figs.

[52] U.S. Cl. .......... 307/259, 307/229, 307/254, 307/255, 307/246, 307/256
[51] Int. Cl. .......... H03k 17/74
[50] Field of Search .......... 307/256, 259, 257, 258, 229

[56] References Cited

UNITED STATES PATENTS

| | | | |
|---|---|---|---|
| 3,055,002 | 9/1962 | Waller | 307/229 |
| 3,130,325 | 4/1964 | Rubin et al. | 307/257 |
| 3,179,817 | 4/1965 | Bounsall | 307/257 |
| 3,244,987 | 4/1966 | Prapis et al. | 307/257 |
| 3,292,010 | 12/1966 | Brown et al. | 307/257 |
| 2,829,251 | 4/1958 | Patton | 307/257 |

*Primary Examiner*—Donald D. Forrer
*Assistant Examiner*—Harold A. Dixon
*Attorney*—Richard G. Stephens

ABSTRACT: An electronic switch in which an analog input signal is applied to an output terminal through two oppositely-poled diodes and a circulating current from a floating current source is circulated through the two diodes so that the effects of their forward voltage drops on the switched current tend to cancel each other. To open the switch the circulating current is diverted from the two diodes and they are reverse-biased by the forward drops across a further pair of diodes.

Figures 1, 2:
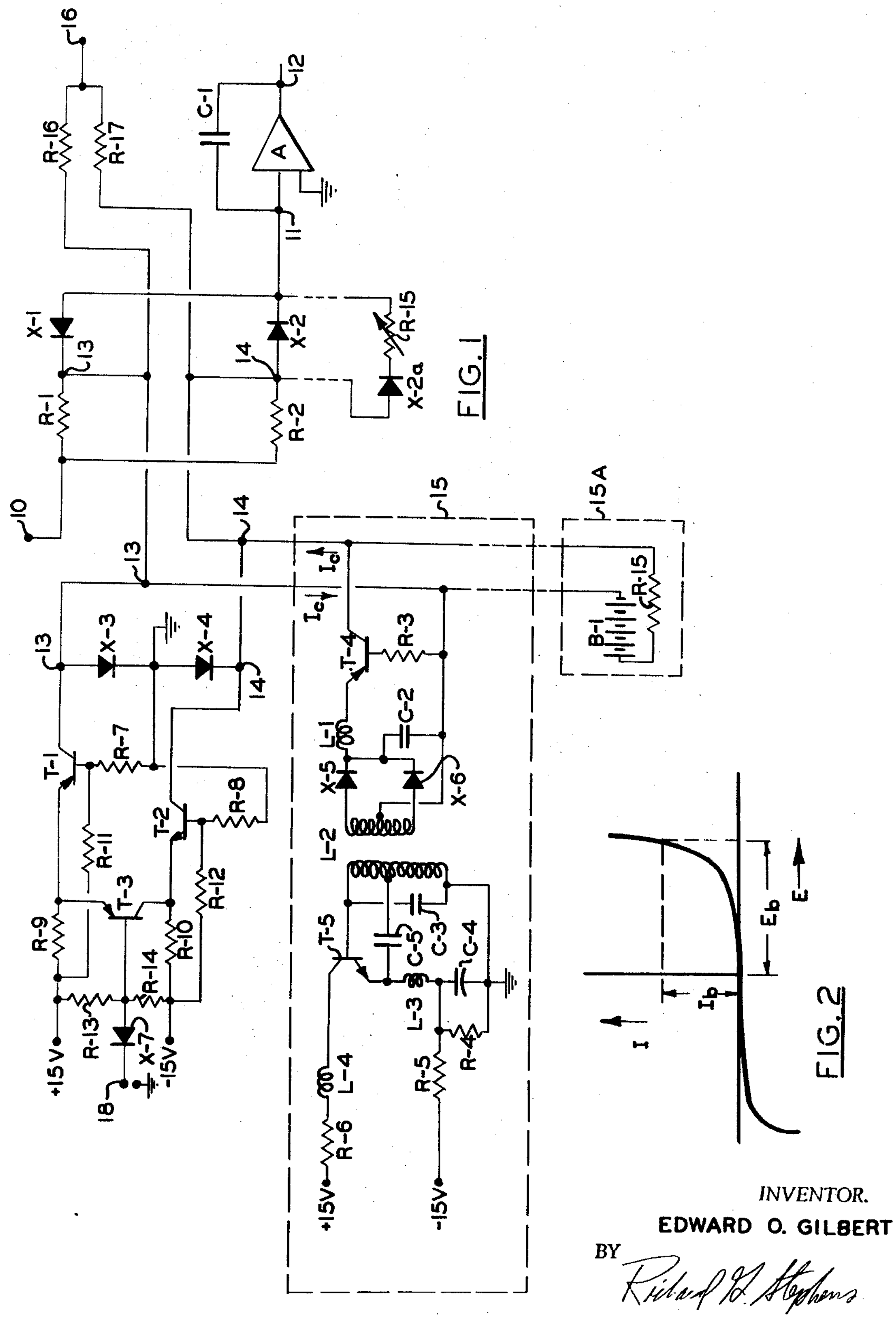

INVENTOR.
EDWARD O. GILBERT
BY Richard L. Stephens

HIGH SPEED LOW-OFFSET ELECTRONIC SWITCH FOR ANALOG SIGNALS

This invention relates to electronic switches, and more particularly, to a fast electronic switch which may be used to selectively connect analog currents from one circuit to another, such as into an operational amplifier, for example. A wide variety of analog computer, automatic control and instrumentation applications require or desirably incorporate such electronic switching circuits. In many such applications it is important (1) that such switching circuits have very low leakage, or otherwise expressed, a very large resistance in their "off," or open condition, (2) that such switching circuits have very low resistance to their "on," or closed condition, (3) that such switching circuits be switchable from one such condition to the other with minimum time as the level of a logic control signal applied to control them is changed from one level to another, (4) that such switches not introduce bias or offset voltages into the signals being switched, (5) that the performance of such switches not vary with temperature, and (6) that components such as resistors used in such switches not be required to be matched extremely precisely, either in terms of absolute resistance or with matching temperature coefficients. The present invention provides an electronic switch which advantageously meets each of the foregoing requirements.

Other objects of the invention will in part be obvious and will, in part, appear hereinafter.

The invention accordingly, comprises the features of construction, combination of elements, and arrangement of parts, which will be exemplified in the constructions hereinafter set forth, and the scope of the invention will be indicated in the claims.

For a fuller understanding of the nature and objects of the invention, reference should be had to the following detailed description taken in connection with the accompanying drawings, in which FIG. 1 illustrates an exemplary embodiment of the invention, and FIG. 2 shows the voltage-current characteristic of a typical silicon diode.

Referring to FIG. 1 of the drawing, the electronic switching circuit shown is arranged to apply input currents from two signal terminals 10 and 16 to summing junction 11 of conventional operational amplifier A when the switch is closed, and to interrupt the flow of such currents when the switch is open. The switch may be used to switch only one signal, of course, or more than two signals, if desired. Each signal to be switched is connected through one resistor to terminal 13, and through an equal resistor to terminal 14. Thus in the drawing resistors R1 and R2 are equal, and resistors R-16 and R-17 are equal. As will become clear below, the input impedance to each input signal is that of the parallel combination of the two resistances through which it is applied.

A conventional operational amplifier A is shown connected with feedback capacitor C-1 to function as an integrator. In many applications a resistive feedback impedance will be used instead to cause the amplifier to operate as a summer. The amplifier is provided with extremely high gain, e.g., of the order of $10^8$ at DC so that summing junction 11 is maintained virtually at ground potential. With summing junction 11 at zero potential, it will be seen that diode X-1 will conduct whenever terminal 13 is more negative than the forward threshold voltage (e.g., 0.6 volt) of silicon diode X-1, and otherwise will be reverse-biased or cut off. Also, diode x-2 will conduct when terminal 14 is more positive than the forward threshold voltage of diode X-2, and otherwise will be cutoff or reverse-biased.

In order to close the switch, so that the signals from terminals 10 and 16 will be applied to the amplifier terminal 11, a constant current is generated by a floating constant current generator shown within dashed lines at 15, so that a constant current $I_c$ greater than the maximum input signal current to be applied is circulated from the floating constant current generator 15 into terminal 14, through diodes X-2 and X-1, and out through terminal 13 to return to the floating constant current generator 15. If negligible forward voltage drop is assumed to exist across diodes X-1 and X-2 when they are conducting, the current flowing through diode X-2 to summing junction 11 will be seen to equal the algebraic sum of the constant current $I_c$ plus the input signal current $V_{10}/R_2$, and plus the input signal current $V_{16}/R_{17}$, and the current flowing through diode X-1 will be seen to equal the algebraic sum of the constant current $I_c$ minus the input signal current $V_{10}/R_1$, and minus the input signal current $V_{16}/R_{16}$, wherein $V_{10}$ and $V_{16}$ are the input voltages at terminals 10 and 16, respectively, and wherein $R_1$, $R_2$, $R_{16}$ and $R_{17}$ are the resistances of resistors R-1, R-2, R-16 and R-17, respectively. A given change in the input signals, such as more positive voltages at terminals 10 and 16, will be seen to result in an increase in the total current through diode X-2 and a decrease in the total current through X-1, while conversely, more negative voltages at terminals 10 and 16 will result in a decrease in the total current through X-2 and an increase in the total current through X-1. The constant current $I_c$ is selected to be sufficiently great that diode X-1 current remains above a predetermined value $I_b$ during the maximum positive excursion of the sum of the applied input signals, and so that diode X-2 current remains above such a predetermined value during the maximum negative excursion of the sum of the applied input signals, and the predetermined value $I_b$ is a value located on a steep conducting-portion of the diode voltage-current characteristic, as indicated in FIG. 2. With diodes X-1 and X-2 conducting, the difference between the current flowing away from summing junction 11 through X-1 and that flowing toward summing junction through X-2 during any input signal condition will be seen to equal: $V_{10}/R_1+V_{10}/R_2+V_{16}/R_{16}+V_{16}/R_{17}$.

If $R_1$ equals $R_2$ and $R_{16}$ equals $R_{17}$, the mentioned difference current, or net input current to terminal 11, will be seen to equal $2V_{10}/R_1+2V_{16}/R_{16}$. The operation of feedback amplifier A is to provide an equal and opposite current to summing junction 11 through its feedback impedance and to maintain summing junction 11 virtually at ground potential. With diodes X-1 and X-2 conducting, the small forward voltage drops across them will be seen to locate terminals 13 and 14 at small negative and positive voltages, respectively, with respect to ground. With transistors T-1 and T-2 both cutoff, diodes X-3 and X-4 will be seen to be slightly back-biased by the voltages on lines 13 and 14, and hence cutoff.

It is highly desirable that diodes X-1 and X-2 be a pair of matched diodes having closely similar voltage characteristics. If the constant current from source 15 is sufficient in magnitude to cause diodes X-1 and X-2 each to operate on a steep portion of their characteristic curve when the switch is closed, so that the voltage drops across the two diodes are essentially the same even though different amounts of current are flowing though the two diodes, it will be seen that the voltage drops across the two diodes will cancel each other, closely approximating the operation of an ideal switch having no closed resistance. It is desirable whenever the switch is closed that the constant current $I_c$ be sufficient in magnitude that the minimum value of current through each of diodes X-1 and X-2 remain above the predetermined value $I_b$ during maximum input signal conditions, so that the forward voltage drops across the two diodes remain very nearly equal to each other. Shown in dashed lines connected in parallel with diode X-2 is an optional diode X-2*a* and an adjustable resistor R-15, to illustrate a technique by which any pair of diodes, such as X-1 and X-2 may be provided with adjustable means for matching voltage and resistance characteristics.

In order to open the switch, so that amplifier A will no longer respond to the input voltages at terminals 10 and 16, transistors T-1 and T-2 are turned on to apply current through diodes X-3 and X-4. When transistor T-1 is turned on to apply current through diode X-3, the forward voltage drop across diode X-3 raises line 13 in a positive direction sufficiently to cutoff diode X-1, and turning on transistor T-2 to apply current through diode X–4 causes the X–4 forward drop to make line 14 sufficiently negative to cutoff diode X–2. With diodes X–1 and X–2 cutoff, the constant current from generator 15 will be seen to flow through diodes X–3 and X–4, in a direction opposite to that of the currents applied by the transistors through X–3 and X–4. The T–1 collector current minus the constant current $I_c$, plus the signal current applied through R–1 and R–16, will be seen to flow through X–3, and the T–2 collector current minus the constant current $I_c$, minus the signal current applied through R–2 and R–17, will be seen to flow through diode X–4. The currents applied by transistors T–1 and T–2 through diodes X–3 and X–4 theoretically may be many times the magnitude of the constant current, but in practice it is desirable in the interest of switching speed, that the transistors T–1 and T–2 be small transistors having minimum junction capacity, and desirable that they not be required to saturate when the switch is open, due to the added recovery time required if they become saturated, and in practice the transistor currents are preferably arranged to be slightly more than double or triple the constant current from floating source 15. Unlike many diode applications, the forward drops or forward resistances of diodes X–3 and X–4 cannot be zero, as in a theoretical or ideal diode, but must be finite, in order to provide a definite back-bias to diodes X–1 and X–2 when the switch is open. The circuit will operate with larger values of back-bias, such as if two or more diodes are used in series for X–3 and two or more for X–4, or if resistances are used in series with X–3 and X–4 but with no apparent advantage, and it is undesirable to back-bias diodes X–1 and X–2 any more than necessary, since diodes X–1 and X–2 have some capacity and use of a high back-bias increases their recovery time.

An advantageous feature of the present invention is that only diodes (X–1 and X–2) which have considerably less capacity than transistors, need be used in the analog signal path between a switch input terminal (such as 10 or 16) and the switch output terminal 11, thereby providing improved switching speed.

A further advantage of the present invention is that conduction of the diodes in the analog signal path is controlled very simply by only slight changes in the potentials at diodes X–3 and X–4, which also advantageously are low-capacity diodes, so that recovery time is very small, as none of the diode capacities are charge up to high voltages. Furthermore, only very small voltage changes are required in transistors T–1 and T–2 as the circuit is switched between "open" and "closed" conditions, so that the capacities of the transistors never need be charged or discharged over a large voltage swing.

Constant current generator 15 is shown as comprising a conventional transistorized oscillator having a resonant tank circuit comprising capacitor C–3 and the primary winding of an RF transformer L–2. Current flows from a positive supply terminal through collector resistor R–6 and choke L–4, through the collector and base of transistor T–5 and the primary winding of L–2 to a negative supply terminal to which a low pass filter R–4, C–4 is connected. A tap on the primary winding provides positive feedback between emitter and base to sustain oscillation. A frequency of the order of 20 MegaHertz has proven satisfactory.

The secondary winding of transformer L–2 is ungrounded, and shown connected to a pair of diodes X–5, X–6 to provide full-wave rectification of the high frequency signal induced in the secondary winding. Choke L–1 and capacitor C–2 filter the rectified 20 mh. signal to provide a DC voltage which is applied to the emitter of grounded-base transistor T–4, which is connected as a constant current regulator, thereby providing a constant current which flows out from generator 15 on line 14 and back into generator 15 on line 13. A constant current of 5 ma. has proven satisfactory for many applications. It should be noted that the precise magnitude of the current provided by the floating current source is not critical, so long as the current is large enough in magnitude to exceed the maximum input signal current by the amount $I_b$ sufficient to insure that diodes X–1 and X–2 remain on a steep conducting portion of their characteristic during a maximum input signal of either polarity. Hence temperature variations which cause some variation in the current output from source 15 cause no appreciable effect on the operation of the switching circuit. It is important to note that the L–2 secondary winding and transistor T–4 are ungrounded, so that the currents flowing out to terminal 14 and in from terminal 13 are not affected by the voltage of terminal 14 or the voltage of terminal 13 with respect to ground. Because the flow of current out through line 14 and X–2 exactly equals the flow of current through diode X–1 and terminal 13, the flow of the constant current does not alter the net input current to the switch output terminal, amplifier summing junction 11. Where a floating current source is provided by AC coupling and rectifying an alternating signal, such as in the manner shown in the drawing, it is ordinarily highly desirable that the alternating-current portions of the current source be effectively shielded to prevent high frequency signals from being coupled into the control circuit and into the analog signals being switched.

An alternative form of floating current sources is shown at 15A as comprising a simple battery and resistor R–15. Irrespective of which type of floating current source is used, it is desirable that its capacity to ground to minimized.

With transistor T–3 cutoff, T–1 and T–2 are turned on to open the switch. The R–11 and R–7 voltage divider biases transistor T–1 on, and the R–12, R–8 voltage divider biases transistor T–2 on. When T–3 is turned on the T–1 emitter is pulled negative, thereby turning off T–1, and T–2 emitter is pulled positive, thereby turning off T–2. The R–13, R–14 voltage divider biases the T–3 base slightly positive relative to the T–3 emitter in the absence of an input signal at terminal 18, holding T–3 cutoff. Application of a negative input signal at terminal 18 turns T–3 on. When the switch is closed, diodes X–1 and X–2 are conducting, diodes X–3 and X–4 and transistors T–1 and T–2 are off, and transistor T–3 is on. A negative signal applied at control terminal 18 will be seen to result in transistor T–3 being turned on, so that the switching circuit will be closed.

When the switch is open, diodes X–1 and X–2 are cutoff, diodes X–3 and X–4 and transistors T–1 and T–2 are conducting, and transistor T–3 is off. A relatively positive signal applied to control terminal 18 will cutoff T–3 to result in the switching circuit being open.

When the switch is closed, the transistors T–1 and T–2 are cutoff as mentioned above, and diodes X–3 and X–4 are slight back-biased by the forward voltage drops across X–1 and X–2. In order to open the switch, transistors T–1 and T–2 are made to conduct, and diodes X–3 and X–4 made to conduct, so that diodes X–3 and X–4 and transistors T–1 and T–2 "rob" or divert the constant current from diodes X–1 and X–2, and provide voltage on terminals 13 and 14 to back-bias diodes X–1 and X–2. Turning on transistor T–2 swings terminal 14 from a slightly positive voltage to a slightly negative voltage, so that a relatively heavy current ($I_{x4}+I_c+V_{10}/R_2+V_{16}/R_{17}$) flows through transistor T–2. Turning on T–1 swings terminal 13 from a slightly negative voltage to a slightly positive voltage, so that a relatively heavy current ($I_{x3}-I_c-V_{10}/R_1-V_{16}/R_{16}$) flows from transistor I–1. The forward drop across diode X–3 will be seen to make terminal 13 positive, so that diode X–1 is then cutoff, and the forward drop across X–4 to make terminal 14 negative, so that diode X–2 is then cutoff.

It is another advantageous feature of the invention that transistors T–1 and T–2 need not be matched closely, since the precise amount of collector current provided by each such transistor is immaterial, so long as it is sufficient to provide a forward drop across a diode (X–3 or X–4) sufficient to cutoff a diode (X–1 or X–2) in the analog switching path.

As mentioned above, the constant current $I_c$ from source 15 should exceed the maximum input signal current $I_{sm}$ defined as $I_{sm}=V_{10max}/R_1+V_{16\,max}/R_{16}$, by a predetermined amount $I_b$, in order to provide matched oppositely acting voltage drops across diodes X–1 and X–2 when the switch is closed. In order to insure complete cutoff of diodes X-1 and X-2 when the switch is open, each of transistors T-1 and T-2 must be capable of providing the following amount of current: $I_c+I_{sm}$ $I_d$ where $I_d$ is the amount of current required for diode X-3 or X-4 to operate on a steep portion of its characteristic. If diodes X-1 to X-4 are all similar, $I_d$ equals $I_b$.

In one successful embodiment of the invention, the following component values and types were utilized:

| | |
|---|---|
| R-1, R-2, R-16, R-17 | 100 K |
| R-3 | 51 K |
| R-4 | 1.3 K |
| R-5 | 2.2 K |
| R-6 | 39 ohm |
| R-7, R-8 | 3 K |
| R-9, R-10 | 1.2 K |
| R-11, R-12 | 12 K |
| R-13 | 10 K |
| R-14 | 20 K |
| C-1 | 1.0 mfd. |
| C-2 | 2.0 mfd. |
| C-3 | 51 pf. |
| C-4, C-5 | 0.001 mfd. |
| L-3, L-4 | 5 μh. |
| T-1 and T-3 | type 2N3640 |
| T-2 | type 2N3646 |
| Diodes X-1 and X-2 | type 1N485A |
| Diodes X-3 and X-4 | type 1N4154 |
| Transistor T-5 | type 2N3640 |

While the invention has been shown in connection with the switching of input signals into the summing junction of an operational amplifier, it will be readily apparent that the invention is readily applicable to a variety of other applications where input currents are to be selectively connected to a circuit terminal having a predetermined potential. If the output terminal of the switch is to be connected to a point other than ground or virtual ground, it should be apparent that the junction between diodes X-3 and X-4 should be connected to the same potential, and the supply voltages and control terminal 18 referenced to that potential. While each input signal has been shown applied to terminals 13 and 14 through a pair of resistors, it is important to recognize that such resistor pairs may be replaced by matching complex impedances haVing any desired transfer function.

The invention will operate, though less satisfactorily, if diodes X-3 and X-4 are omitted. Omission of diodes X-3 and X-4 allows terminals 13 and 14 to swing to much higher voltage levels when the switch is opened, so that the capacitances of transistors T-1 and T-2 and those of diodes X-1 and X-2 become charged to much greater voltage levels, thereby disadvantageously increasing switch closure time.

It will be apparent that further secondary windings may be provided on L-2, together with further rectifiers, filters and constant-current regulators, to provide separate constant currents for further similar switching circuits.

It will thus be seen that the objects set forth above, among those made apparent from the preceding description, are efficiently attained, and since certain changes may be made in the above constructions without departing from the scope of the invention, it is intended that all matter contained in the above description of shown in the accompanying drawings shall be interpreted as illustrative and not in a limiting sense.

The embodiments of the iNvention in which an exclusive property or privilege is claimed are defined as follows:

I claim:

1. An electronic switching circuit having conducting and nonconducting conditions, said switching circuit being operable to apply an output current to an output terminal at a reference potential level during the conducting condition of said switching circuit, with the magnitude and polarity of said output current being commensurate with the magnitude and polarity of an input voltage applied to an input terminal, and said switching circuit being operable to interrupt the flow of current between said input terminal and said output terminal during the nonconducting condition of said switching circuit, comprising, in combination: first unidirectional conducting means having its cathode connected to said output terminal and its anode connected to a third terminal; second unidirectional conducting means having its anode connected to said output terminal and its cathode connected to a fourth terminal; a first impedance connected between said third terminal and said input terminal; a second impedance connected between said fourth terminal and said input terminal a current source floating with respect to said reference potential level connected to circulate a direct current into said third terminal and out of said fourth terminal during both conducting and nonconducting conditions of said switching circuit, whereby current flows through said first and second unidirectional conducting means during the conducting condition of said switching circuit and said output current is applied to said output terminal; and control circuit means having an impedance connected between said third and fourth terminals, said control circuit means being responsive to a control signal and operable to conduct current circulated by said current source during the occurrence of said control signal and provide a voltage drop across said control circuit means which reverse-biases said first and second unidirectional conducting means, thereby diverting current from said current source to flow through said control circuit means rather than through said first and second unidirectional conducting means, and thereby interrupting the flow of current between said input terminal and said output terminal during nonconducting condition of said electronic switching circuit.

2. A circuit according to claim 1 in which each of said unidirectional conducting means comprises a diode and in which said first and second impedances comprise equal resistances.

3. A circuit according to claim 1 having a third impedance connected between said third terminal and a fifth terminal, a fourth impedance connected between said fourth terminal and said fifth terminal and a second input voltage connected to said fifth terminal, whereby said output current varies as a function of the sum of said input voltages.

4. A circuit according to claim 1 in which said current source is arranged to supply an amount of direct current which exceed a current equal to the ratio between the maximum value of said input voltage and the value of said first impedance.

5. A circuit according to claim 1 in which said current source comprises rectifying means connected to an inductor to rectify an alternating signal induced in said inductor.

6. A circuit according to claim 1 in which said current source comprises a storage cell.

7. A circuit according to claim 1 including a negative feedback amplifier having an amplifier input circuit and a feedback impedance connected to said output terminal.

8. A circuit according to claim 1 in which said first and second unidirectional conducting means comprise first and second semiconductor diodes having substantially identical forward potential characteristics.

9. A circuit according to claim 1 in which said control circuit means comprises a third impedance means connected between said third terminal and a reference terminal at said reference potential level, a fourth impedance means connected between said fourth terminal and a reference terminal at said reference potential level, and means responsive to said control signal for applying currents through said third and fourth impedance means to reverse-bias said first and second unidirectional conducting means.

10. A circuit according to claim 9 in which said third and fourth impedance means comprise third and fourth unidirectional conducting means, respectively, the cathode of said third unidirectional conducting means being connected to said third terminal, and the anode of said fourth unidirectional conducting means being connected to said fourth terminal.

11. A circuit according to claim 9 in which said means for applying currents through said third and fourth impedance means comprises transistor means.

12. A circuit according to claim 4 in which said means for applying currents through said third and fourth impedance means is operative to apply a current through said third impedance means in excess of the sum of said predetermined amount of current and a current equal to the ratio between the maximum value of said input voltage and the value of said first impedance.

13. A circuit according to claim 4 in which said means for applying currents through said third and fourth impedance means comprises a first transistor having its collector-emitter circuit connected to draw current from said third terminal, a second transistor having its collector-emitter circuit connected to supply current to said fourth terminal, and means responsive to said control signal for controlling the conduction of said first and second transistors.

14. An electronic switch, comprising, in combination: a first resistance and a first diode connected in series between an input terminal and an output terminal maintained at a reference potential level, the cathode of said first diode being connected to said output terminal; a second resistance and a second diode connected in series between said input terminal and said output terminal, the anode of said second diode being connected to said output terminal; a current source floating with respect to said reference potential level connected to apply direct current to the junction between said first resistance and said first diode and to receive current from the junction between said second resistance and said second diode during both conducting and nonconducting conditions of said switch; first transistor means having a pair of electrodes connected between a source of negative potential and the junction between said first resistance and said first diode; second transistor means having a pair of electrodes connected between a source of positive potential and the junction between said second resistance and said second diode; and means responsive to a control signal for establishing and interrupting the conduction of current through said pairs of electrodes of said transistor means to control said electronic switch.

15. A switch according to claim 14 having a third diode connected between a terminal at said reference potential level and said junction between said first resistance and said first diode, the anode of said third diode being connected to said terminal at reference potential level, and a fourth diode connected between said terminal at reference potential level and said junction between said second resistance and said second diode, the cathode of said fourth diode being connected to said terminal at reference potential level, whereby said third and fourth diodes conduct during said nonconducting condition of said switch and limit the voltage excursions of said junctions relative to said reference potential level.